US00H002276H

(19) United States
(12) Statutory Invention Registration
Burgin

(10) Reg. No.: US H2276 H
(43) Published: Jun. 4, 2013

(54) BRANCHED AMIDE POLYMERIC SUPERABSORBENTS

(75) Inventor: Timothy P. Burgin, King George, VA (US)

(73) Assignee: The United States of America, as represented by the Secretary of the Navy, Washington, DC (US)

(21) Appl. No.: 13/385,467

(22) Filed: Jan. 9, 2012

(51) Int. Cl.
*C08F 236/20* (2006.01)

(52) U.S. Cl. ..... 526/303.1
(58) Field of Classification Search ..... 526/303.1
See application file for complete search history.

(56) References Cited

U.S. PATENT DOCUMENTS

| | | | | |
|---|---|---|---|---|
| 2,512,606 | A | 6/1950 | Bolton et al. | |
| 5,071,902 | A | 12/1991 | Langerbeins et al. | 524/458 |
| 5,093,030 | A * | 3/1992 | Ito et al. | 516/77 |
| 5,567,797 | A | 10/1996 | Christ et al. | 528/310 |
| 6,277,911 | B1 | 8/2001 | Torre | 524/606 |
| 6,884,865 | B1 | 4/2005 | Di Silvestro et al. | 528/310 |
| 6,910,823 | B2 | 6/2005 | Policicchio et al. | 401/138 |
| 7,182,537 | B2 | 2/2007 | Policicchio et al. | 401/138 |
| 7,615,270 | B2 | 11/2009 | Lee et al. | 428/35.2 |
| 7,833,624 | B2 | 11/2010 | Harren et al. | 428/403 |
| 7,988,860 | B2 | 8/2011 | Kalayci et al. | 210/679 |
| 2006/0029782 | A1 | 2/2006 | Harren et al. | 428/212 |
| 2008/0255531 | A1 | 10/2008 | Ring et al. | 604/368 |
| 2009/0065436 | A1 | 3/2009 | Kalayci et al. | 210/679 |
| 2010/0285094 | A1 | 11/2010 | Gupta | 424/429 |

* cited by examiner

*Primary Examiner*—Daniel Pihulic
(74) *Attorney, Agent, or Firm*—Gerhard W. Thielman; Oscar A. Towler, III

(57) ABSTRACT

A superabsorbent polymeric material for absorption of organic liquids which includes at least one cross-linked branched amide polymer for absorbing and retaining quantities of organic liquids equivalent to several times its dry weight.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

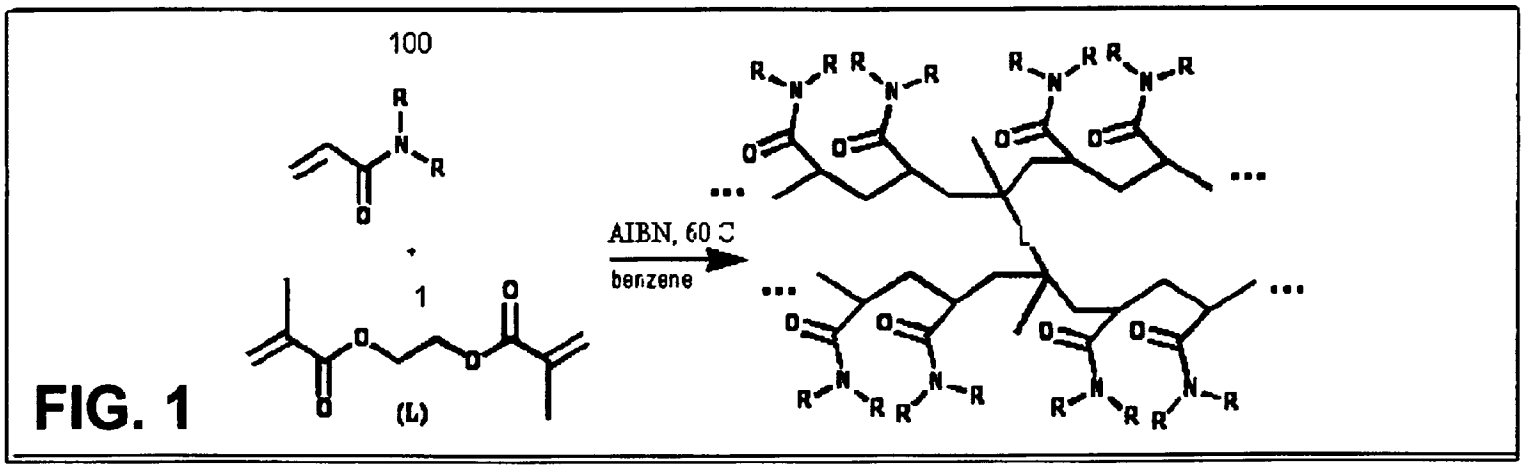
FIG. 1
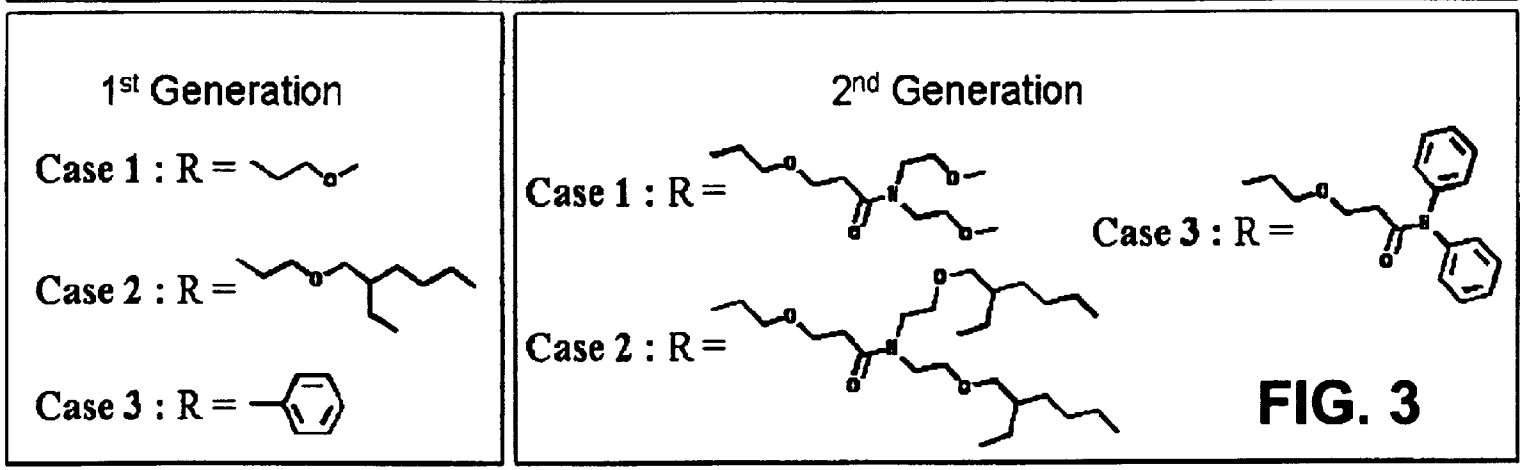
FIG. 2
FIG. 3

BRANCHED AMIDE POLYMERIC SUPERABSORBENTS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

1. Technical Field

Embodiments of this disclosure relate to superabsorbents, also known as superabsorbent polymers or SAP, for the absorption of a broad spectrum of organic liquids at low percentages of absorber (5% or less). Specifically, the disclosure describes branched amide polymeric superabsorbents for the mitigation of hazardous organic solvents in the environment.

2. Discussion of the Prior Art

Current commercially available sorbents may require 10% (w/w) or more of material to immobilize organic liquids. They may also have a limited range of liquids for which they are highly effective. Generally, sorbents fall into two classes, i.e., adsorbents and absorbents. Adsorbents immobilize liquids through interaction of the liquid with the surface of the material and therefore have a capacity that can be limited by the materials surface area. Absorbents may also take liquid into the internal molecular structure of the material, resulting in much higher capacity relative to adsorbents.

The balance of the interstitial solvent-material interactions and the absorption induced strain in the material determines the capacity of an absorbent material for a given solvent. The degree of swelling of a polymeric absorbent is solvent dependent, and depends on the chemical structure of the polymer backbone in addition to other factors.

Very few highly absorbent polymers for organic liquids and solvents have been identified in the literature; nearly all of them are based on alkyl acrylates. The alkyl acrylates strongly absorb some non-polar solvents but are unsuitable for solvents of higher polarity. A copolymer of alkyl acrylates with a hydrophobic trialkylammonium salt showed inverse behavior with a high absorption capacity for polar solvents and a low absorption capacity for nonpolar solvents. While the absorption capacity of the copolymer may be impressive (over one-hundred times its weight for some solvents), the material suffers from a very high projected manufacturing cost. None of the known absorbents have high absorption capacities over a broad range of solvent polarities and types, i.e., alkyl, aromatic, non-polar, polar aprotic, polar protic, etc.

SUMMARY OF THE DISCLOSURE

Accordingly, the polymers of the present disclosure have been developed as highly absorbent polymeric materials that can be manufactured at low cost, and cover a broader range of solvents.

In accordance with an embodiment of the disclosure, the superabsorbent polymeric material for absorption of organic liquids is at least one crosslinked branched amide polymer. In another embodiment of the disclosure, a composition includes the superabsorbent polymeric material, which may be in the form of a film, a layer, a sheet, a pad, a gel, particles, or fibers. Other embodiments of the superabsorbent polymeric material and co-polymers for structural functionality are provided in the detailed description as provided.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a first chemical structural view of cross-linked branched amide polymers with a high absorption capacity for organic liquids;

FIG. 2 is a second chemical structural view of cross-linked branched amide polymers with a high absorption capacity for organic liquids; and FIG. 3 is a third chemical structural view of cross-linked branched amide polymers with a high absorption capacity for organic liquids.

DETAILED DESCRIPTION OF THE DISCLOSURE

A more complete appreciation of the disclosure and many of the attendant advantages will be readily obtained, as the same becomes better understood by reference to the following detailed description when considered in connection with the accompanying drawing. In describing and claiming the present invention, the following terminology will be used in accordance with the definitions set out below.

The term "polymer" is used to refer to a chemical compound that comprises linked monomers, and that may or may not be linear, crosslinked or thermosetting. The term "monomer" is used generically, unless otherwise indicated, to mean monomers, comonomers, termonomers, and tetramonomers. "Branched" polymers are understood to include hyperbranched polymers (containing two or more generations of branching), which are obtained via a polymerization reaction. The branched polymers of the present disclosure are crosslinked and may include statistical, gradient and alternating branched copolymers.

The phrases "organic solvents" and "organic liquids" are interchangeable and understood to include a chemical class of compounds that are used routinely in commercial industries. They share a common structure (at least one carbon atom and one hydrogen atom), low molecular weight, volatility, and they exist in liquid form at room temperature. They may be grouped further into aliphatic-chain compounds, and as aromatic compounds. Examples of the organic solvents include, but are not limited to, alicyclic hydrocarbons such as cyclohexane and cyclopentane, aliphatic hydrocarbons such as n-pentane, n-hexane, n-heptane and ligroin, and aromatic hydrocarbons such as benzene, toluene and xylene.

In an embodiment, this disclosure provides a new class of superabsorbent polymers for use with non-aqueous organic liquids and solvents. These superabsorbent polymers have a high absorption capacity for both polar solvents and nonpolar solvents. The superabsorbent polymers of the present disclosure are capable of absorbing and retaining quantities of organic liquids equivalent to many times their own weight. The superabsorbents are crosslinked branched amide polymers, in which with each succeeding generation an additional branch point is introduced into the polymers side chains. The additional branch point provides sites for solvent interaction with the backbone and a larger degree of sterically induced extension of the plymer backbone as solvent enters the interstitial sites along the polymer backbone.

In an embodiment, these polymeric materials absorb a broad spectrum of organic liquids with high efficiency, and have absorption capacities as high as 500 times their dry weight. These polymeric materials may also be relatively inexpensive to manufacture, as they can be prepared from readily available starting materials.

FIGS. 1 through 3 show the general structure of the superabsorbent polymers. The illustrated general structure shows the mechanism and components for formulating the crosslinked branched amide polymers of the disclosure, which have a high absorption capacity for organic liquids. The R substitutents, as shown in each first and second generation, are branched and substituted or unsubsitituted, in three case scenarios. When any of the R substituents represents or contains an alkyl substituent group, these may be linear or branched and may contain up to 40, preferably up to six carbon atoms. An aryl group or moiety may contain from one to 40 carbon atoms.

In an embodiment, the polymeric material is poly[N,N-di(2-methoxyethyl)acrylamide, which absorbs organic liquids with dielectric constants between two and 40 at 15 times its weight or more. In another embodiment, the superabsorbent polymeric materials of the present disclosure may be prepared by mixing the monomers in desired stoichiometric ratios in solution and then initiating free-radical copolymerization. In addition, branched polymers may be generally prepared via a step-growth mechanism involving the polycondensation of a mixture of mono-functional and multi-functional monomers. The mono-functional monomers polymer chains and where a multi-functional monomer is introduced into the chain a branch point is formed.

Crosslinking may be affected during polymerization by incorporation of suitable crosslinking monomers. Alternatively, the polymers can be crosslinked after polymerization by reaction with a suitable reactive crosslinking agent. Reaction temperature, pH, amount of added initiator, concentration, and reaction time may control the extent of crosslinking and molecular weight increase after addition of the initiator. In another embodiment, the superabsorbent polymeric materials may be in the form of a film, a layer, a sheet, a pad, a gel, particles (granules), and fibers, and may be combined in compositions with other materials for higher absorption capacity and long-term effectiveness.

In view of the above disclosure, the polymeric materials demonstrate organic liquid absorbent capability that has several commercial applications, including chemical waste treatment, spill clean up, and solvent entrainment. In addition, these polymeric materials may significantly outperform any commercially available material at comparable cost.

Obviously, numerous modifications and variations of the disclosure are possible in light of the above disclosure. It is therefore understood that within the scope of the appended claims, the disclosure may be practiced otherwise than as specifically described herein.

What is claimed is:

1. A superabsorbent polymeric material for absorption of organic liquids consisting essentially of at least one crosslinked branched amide polymer.

2. The superabsorbent polymeric material according to claim 1, wherein the superabsorbent polymeric material absorbs and retains quantities of organic liquids equivalent to several times its dry weight.

3. The superabsorbent polymeric material according to claim 1, wherein the cross-linked branched amide polymer has an absorption capacity as high as 500 times its dry weight.

4. The superabsorbent polymeric material according to claim 1, wherein the cross-linked branched amide polymer absorbs organic liquids with dielectric constants between two and 40 at 15 times its weight or more.

5. The superabsorbent polymeric material according to claim 1, wherein the cross-linked branched amide polymer is poly[N,N-di(2-methoxyethyl)acrylamide].

6. The superabsorbent polymeric material according to claim 1, wherein the organic liquids consist of polar and non-polar solvents.

7. The superabsorbent polymeric material according to claim 6, wherein the solvents comprise alicyclic organic liquids.

8. The superabsorbent polymeric material according to claim 6, wherein the solvents comprise aliphatic organic liquids.

9. The superabsorbent polymeric material according to claim 6, wherein the solvents comprise aromatic organic liquids.

10. The superabsorbent polymeric material according to claim 6, wherein the solvents comprise hydrocarbons.

11. A composition comprising the superabsorbent polymeric material according to claim 1.

12. The composition according to claim 11, wherein the composition is in the form at least one of a film, a layer, a sheet, a pad, a gel, particles, and fibers.

* * * * *